(12) United States Patent
Barkan et al.

(10) Patent No.: US 7,180,052 B1
(45) Date of Patent: Feb. 20, 2007

(54) NON-HEAVY METAL OPTICAL BANDPASS FILTER IN ELECTRO-OPTICAL READERS

(75) Inventors: Edward Barkan, Miller Place, NY (US); David Tsi Shi, Stony Brook, NY (US); Vladimir Gurevich, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/225,321

(22) Filed: Sep. 13, 2005

(51) Int. Cl.
*H01J 40/14* (2006.01)
*G02B 5/20* (2006.01)

(52) U.S. Cl. .................. 250/226; 250/216; 359/885

(58) Field of Classification Search ............... 250/216, 250/226, 239; 359/885, 890–892
See application file for complete search history.

(56) References Cited

U.S. PATENT DOCUMENTS 4,969,716 A * 11/1990 Scobey et al. ............... 359/885
2003/0209669 A1 * 11/2003 Chou .......................... 250/343

* cited by examiner

*Primary Examiner*—Kevin Pyo
(74) *Attorney, Agent, or Firm*—Kirschstein, et al.

(57) ABSTRACT

Heavy metals such as cadmium are not employed in optical bandpass filters employed in electro-optical readers to comply with governmental regulations concerning endangering the environment.

20 Claims, 3 Drawing Sheets

NON-HEAVY METAL OPTICAL BANDPASS FILTER IN ELECTRO-OPTICAL READERS

BACKGROUND OF THE INVENTION

1. Field of the Invention

The present invention generally relates to electro-optical readers, such as scanners and imagers, for reading codes such as bar code symbols and, more particularly, to an optical bandpass filter for filtering light traveling along a path to a photodetector in such readers, and especially to rendering the filter of non-heavy metals.

2. Description of the Related Art

Electro-optical readers, such as bar code symbol scanners and solid state imagers, have found wide acceptance in retail, wholesale, industrial and military applications. The scanner typically illuminates a symbol comprised of regions of different light reflectivity, senses light of different intensity scattered from the symbol regions with a photodetector such as a photodiode, and determines widths and spacings of the symbol regions to derive information encoded in the symbol. The imager determines the widths and spacings of the symbol regions by capturing and processing an image of the symbol, the image capture being performed by a photodetector such as an array of photocells.

In both types of readers, the photodetector senses the light incident thereon. The light includes the desired light scattered from the symbol regions, as well as undesired light, such as ambient light, sunlight, and light reflected off other objects in the field of view of the reader. An optical bandpass filter is commonly employed in front of the photodetector to allow only the desired light to pass through to the photodetector, and to reject the undesired light. Detection of the undesired light compromises reader performance and can even lead to failure to read the symbol.

It was known in the prior art to make an optical bandpass filter using a clear glass member with an infrared-blocking coating and a Wratten filter, which consists of a brittle cellophane material. It was expensive and difficult to cut to shape the Wratten filter without waste since the Wratten filter tended to fall apart during cutting or punching.

In the case of a moving beam reader where a red laser beam having a wavelength of about 650 nm is swept across the symbol to be read, it was known in the prior art to make the exit window of the reader of a red-colored, plastic material, such that the window itself formed part of the bandpass filter. However, the use of plastic for the exit window made the reader susceptible to scratching and color fading due to exposure to sunlight or chemicals.

It was also known to position the optical bandpass filter inside the reader in front of the photodetector. In the case of the red laser beam, the filter included a red-colored glass member having a dielectric coating to set the higher passband value. The red color of the glass member is caused by a coloring, one of whose components is cadmium which is operative to set the lower passband value. The cadmium is introduced while the glass member is in a molten state.

The use of cadmium, however, is considered by some governmental authorities to pose a potential hazard to the environment. Cadmium is a known eye and skin irritant and has been linked to lung and kidney disease, as well as cancer. Cadmium, like other heavy metals, can be a source of pollution if it is present in high concentrations, or if it is extracted from the glass member by either some natural process, or during the disposal process, for example, by grinding or pulverization.

SUMMARY OF THE INVENTION

Objects of the Invention

Accordingly, it is a general object of this invention to make an optical bandpass filter devoid of heavy metals, especially cadmium, considered by some authorities to be hazardous.

Features of the Invention

In keeping with the above object and others which will become apparent hereinafter, one feature of the present invention resides, briefly stated, in an optical bandpass filter and a method of making and using the filter without heavy metals. The filter is operative for filtering light traveling along a path to a photodetector in an electro-optical reader for reading indicia such as bar code symbols.

In accordance with this invention, a plastic member is located in the path, and a dye comprised of elements not considered by authorities as being hazardous is distributed throughout the plastic member. For example, as noted above, cadmium is considered by some authorities as a hazardous element, and the dye is devoid of cadmium. The dye is operative for absorbing the light having wavelengths shorter than a lower passband value. A dielectric coating is also located in the path. The coating is operative for reflecting the light having wavelengths longer than a higher passband value.

By way of example, if the reader sweeps a red laser beam having a wavelength on the order of 650 nm, then the lower passband value at 50% transmission is about 625 nm, whereas the higher passband value at 50% transmission is about 690 nm. The filter substantially allows most of the light having wavelengths between 625 nm and 690 nm to reach the photodetector while substantially blocking most of the light having wavelengths outside of these wavelengths, all without using cadmium or other heavy metal elements.

The dielectric coating may be applied to an outer surface of the plastic member or, as is preferred, the coating is applied to a glass plate located in the path. The glass plate is not only an ultraviolet (UV) filter, but is a convenient support for the coating. In a typical application, high temperatures are needed to deposit the coating, and such high temperatures can soften or melt many plastic materials. By depositing the coating on glass, the glass will not deform under the high temperatures normally encountered during deposition of the coating.

The photodiode is typically encapsulated in a plastic housing. Hence, in another embodiment, the dye is preferably distributed in the plastic housing and, hence, a separate plastic member is not necessary.

In other embodiments, a collection lens is sometimes used to collect and direct the light to the photodetector. If the lens is made of plastic, then the dye could be distributed throughout the plastic lens. If the lens is made of glass, then the dielectric coating could conveniently be deposited thereon.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
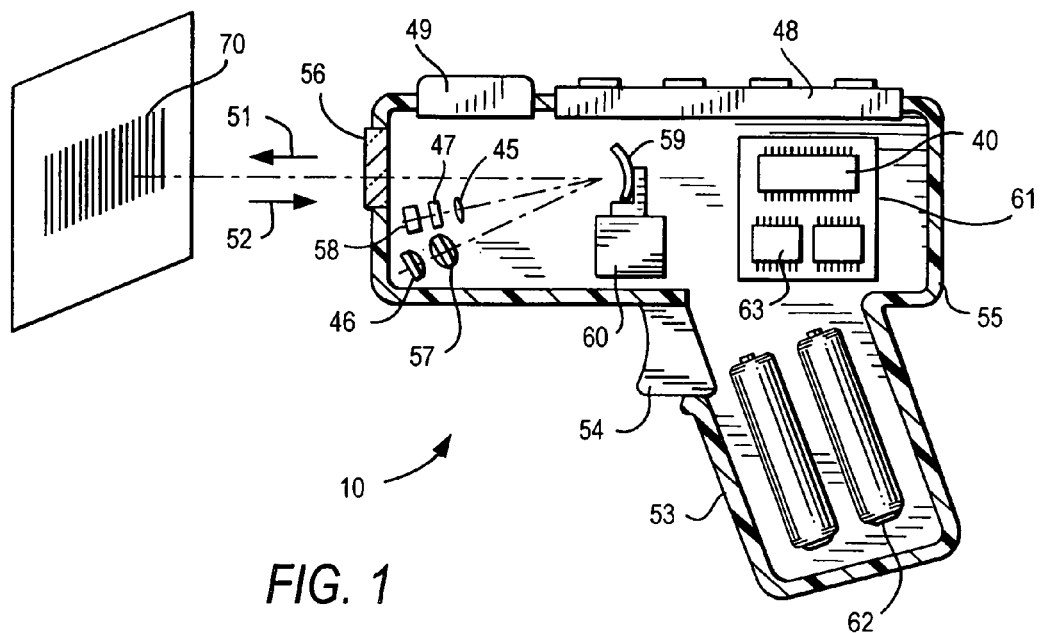
FIG. 1 is a diagrammatic view of an electro-optical reader in which an optical bandpass filter in accordance with this invention is used.

Referring now to the drawings, reference numeral 10 in FIG. 1 generally identifies a portable reader for electro-optically reading indicia such as bar code symbols. The reader 10 is preferably implemented as a gun shaped device, having a pistol-grip handle 53. A lightweight plastic housing 55 contains a light source 46, a detector 58, optics 57, signal processing circuitry 63, a programmed microprocessor 40, and a power source or battery pack 62. An exit window 56 at a front end of the housing 55 allows an outgoing light beam 51 to exit and incoming reflected light 52 to enter. An operator aims the reader at a bar code symbol 70 from a position in which the reader 10 is spaced from the symbol, i.e., not touching the symbol or moving across the symbol.

The optics 57 may include a suitable lens (or multiple lens system) to focus the light beam 51 into a scanning spot at an appropriate reference plane. The light source 46, such as a semiconductor laser diode, introduces a light beam into an optical axis of the lens 57, and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern, such as a scan line or a raster pattern of scan lines, across the symbol.

The light 52 reflected or scattered back by the symbol 70 passes back through the window 56 for transmission to the detector 58. In the exemplary reader shown in FIG. 1, the reflected light reflects off the mirror 59, passes through an optical bandpass filter 47 and impinges on the light sensitive detector 58. As described in detail below, the filter 47 is typically designed to have a bandpass characteristic in order to pass the reflected (return) laser light and block the light coming from other optical sources. The detector 58 produces an analog signal proportional to the intensity of the reflected light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spacings between the bars of the symbol. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination.

To scan the symbol 70, the operator aims the bar code reader 10 and operates the movable trigger switch 54 to activate the light source 46, the scanning motor 60 and the signal processing circuitry. If the scanning light beam 51 is visible, the operator can see a scan pattern on the surface on which the symbol appears and adjust aiming of the reader 10 accordingly. If the light beam 51 produced by the source 46 is marginally visible, an aiming light may be included. The aiming light, if needed, produces a visible light spot which may be fixed, or scanned just like the laser beam 51. The operator employs this visible light to aim the reader at the symbol before pulling the trigger.

The reader 10 may also function as a portable data collection terminal. If so, the reader would include a keyboard 48 and a display 49.

As previously mentioned, the optical bandpass filter 47 is operative for filtering the light 52 traveling along a path to the photodetector 58. The light 52 passes through the window 56 to the mirror 59 for reflection therefrom through the filter 47 to the photodetector. An optional collection lens 45 may be used to focus the light 52 onto the photodetector. If the laser 46 emits a red beam having a wavelength on the order of 650 nm, then it is desired that the filter 47 only allows light in the vicinity of 650 nm to pass and reach the photodetector.

Figure 2:
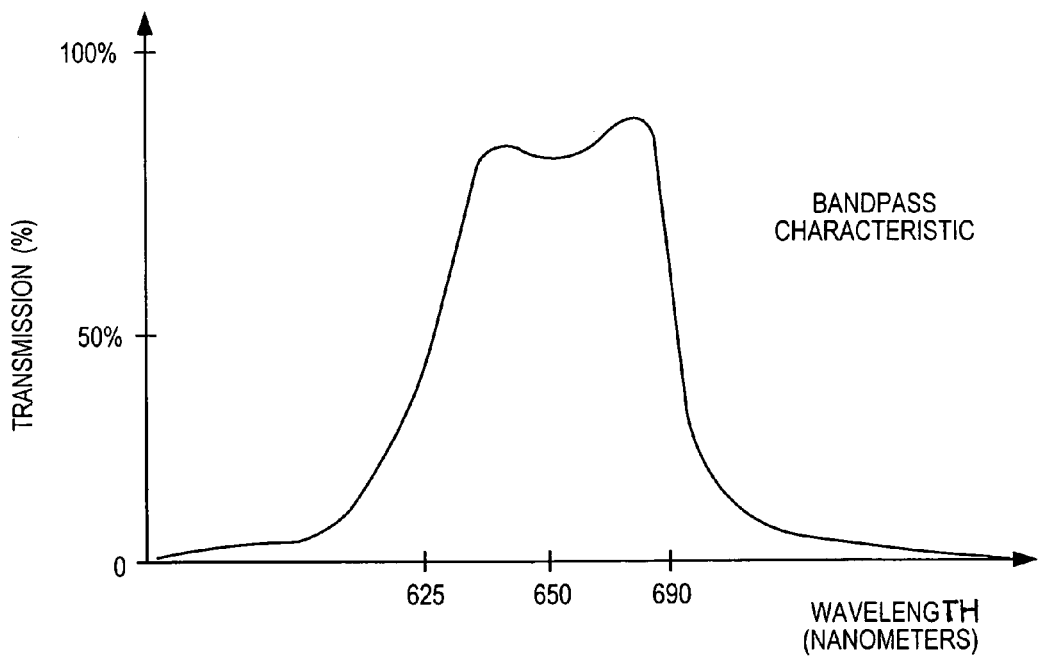
FIG. 2 is a bandpass characteristic of the filter of FIG. 1.

FIG. 2 depicts a typical bandpass characteristic for the filter 47, in which a lower passband wavelength is set at about 625 nm at about 50% transmittance, and a higher passband wavelength is set at about 690 nm at about 50% transmittance. These numerical values are merely exemplary. As described above, the higher passband wavelength is conventionally established by a dielectric coating on a glass member, whereas a red coloring in the glass member established the lower passband wavelength. Yet, one of the components of the red coloring is cadmium which is regarded by some authorities as posing safety and environmental hazards.

Figure 3:
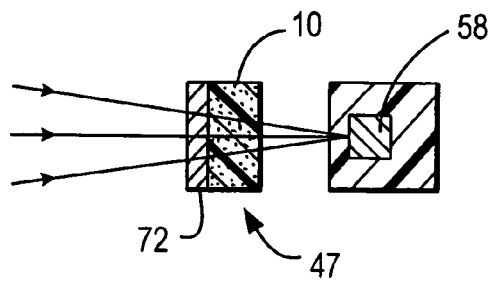
FIGS. 3–6 are diagrammatic views of different embodiments of the filter of FIG. 1.

In accordance with one feature of this invention, cadmium is eliminated. As shown in the FIG. 3 embodiment, the optical filter 47 comprises a plastic member 70 throughout which a dye, as represented by stippling, is distributed. The dye is devoid of cadmium and is operative for absorbing the light having wavelengths shorter than the lower passband wavelength. A dielectric coating 72 is likewise provided in the path and is operative for reflecting the light having wavelengths longer than the higher passband wavelength. The coating 72 is actually a plurality of reflective coatings applied one on top of another, each coating being a fraction of a micron in thickness and being reflective of light of a different wavelength so as to cause interference between light of different wavelengths. In the FIG. 3 embodiment, the coating 72 is applied directly on an outer surface of the red-colored plastic member 70.

Figure 4:
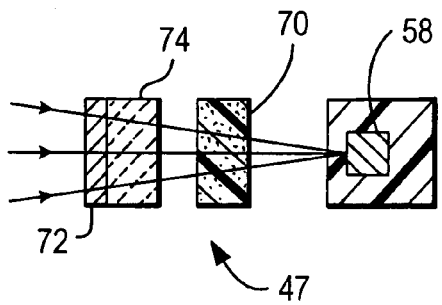

In the FIG. 4 embodiment, the dielectric coating 72 is applied on an outer surface of a glass plate 74. The application of the coating 72 is performed at elevated temperatures sufficient to melt or at least deform plastic, such as the plastic member 70. Hence, to withstand such elevated temperatures, the coating 72 is performed on a glass plate. FIG. 4 depicts that the coated glass plate 74 and the red colored plastic member 70 are discrete elements spaced apart from one another. This was done for convenience of illustration because, in practice, the coated glass plate 74 is adhered directly to the red colored plastic member 70, typically with a light-transmissive glue. The glass plate 74 also serves as an ultraviolet light filter.

Figure 5:
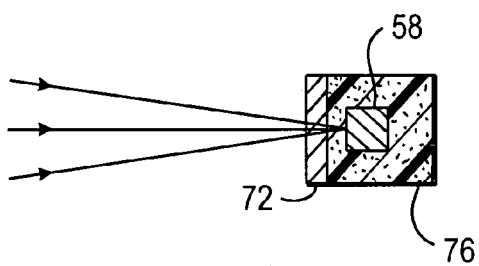
Figure 6:
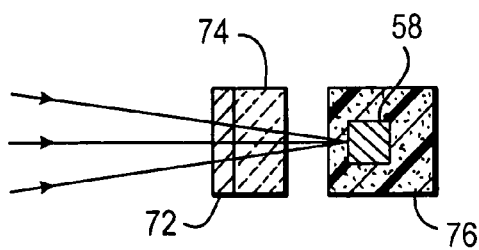

Rather than providing the plastic member 70 as a discrete component, the FIG. 5 embodiment depicts that the plastic member 70 encapsulates the photodiode 58. The photodiode 58 is often encapsulated in a plastic housing 76, and the embodiment of FIG. 5 proposes that the dye be distributed throughout this plastic housing. The dielectric coating 72 can then be applied directly to the colored housing 76 as shown in FIG. 5, or can be applied to the glass plate 74 either remote from the plastic housing 76 as shown in FIG. 6 or adhered thereto.

In the event that the collection lens 45 is employed, then the lens 45 can be integrated into the filter. For example, if the lens 45 is constituted of glass, then the lens can serve as the glass plate 74 in the embodiments of FIGS. 4 and 6. If the lens 45 is constituted of plastic, then the lens can serve as the plastic member 70 in the embodiments of FIGS. 3 and 4.

Figure 7:
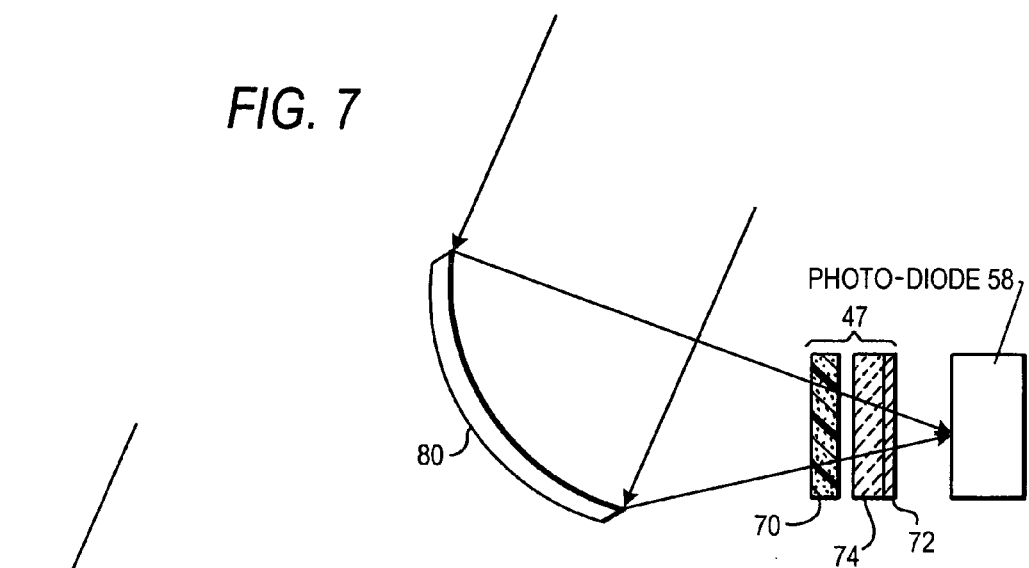
FIGS. 7–8 are diagrammatic views of other embodiments of the filter of FIG. 1.
Figure 8:
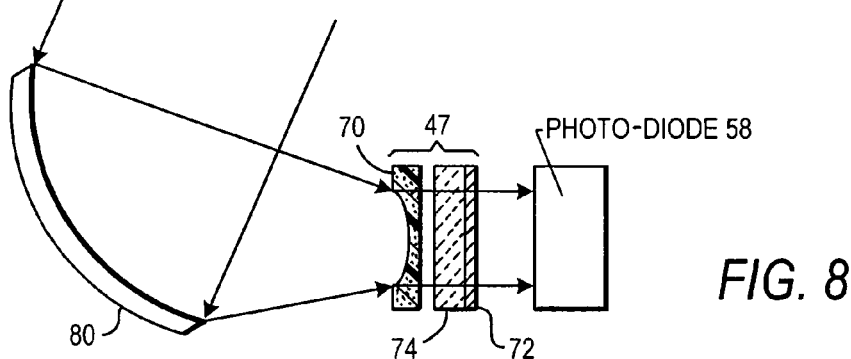
Figure 9:
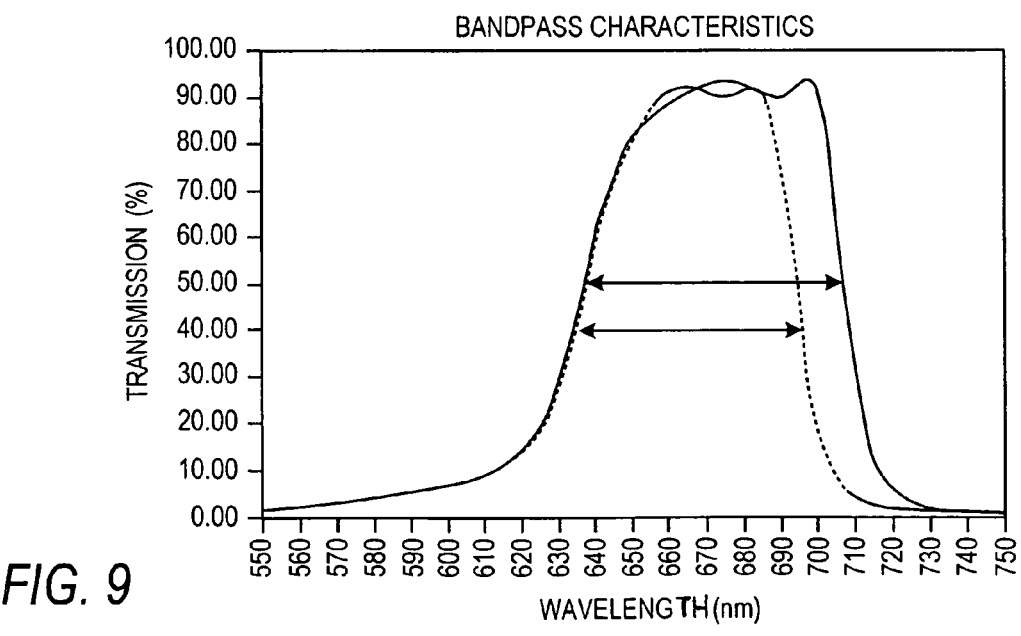
FIG. 9 is a graph comparing the bandpass characteristics of the embodiments of FIGS. 7–8.

As depicted in FIGS. 7–8, the plastic member 70, together with the glass plate 74 on which the dielectric coating 72 is applied, is situated between a light collection mirror 80 and the photodiode 58. FIG. 7 is analogous to FIG. 4, except that the positions of the plastic member 70 and the glass plate have been reversed. The only difference between the embodiments of FIGS. 7–8 is that one of the surfaces of the plastic member is planar in FIG. 7, whereas one of the surfaces of the plastic member is concave in FIG. 8. The bandpass characteristic of the optical filter of FIG. 7 is shown by a solid line in FIG. 9, whereas the bandpass characteristic of the optical filter of FIG. 8 is shown by a broken line in FIG. 9.

The incident angle of the light impinging on the glass plate 74 in FIG. 7 is larger as compared to that of FIG. 8. As the incident angle is reduced, the effective bandwidth of the filter characteristic is likewise reduced. Hence, by changing the curvature of the plastic member, the bandpass characteristic can be tuned.

By avoiding the use of cadmium and other heavy metals, the electro-optical reader is compliant with governmental restrictions on the use of hazardous materials.

It will be understood that each of the elements described above, or two or more together, also may find a useful application in other types of constructions differing from the types described above.

While the invention has been illustrated and described as embodied in optical bandpass filters in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An optical bandpass filter for filtering light traveling along a path to a photodetector in an electro-optical reader for reading indicia, the filter comprising:
   a) a plastic member in the path;
   b) a dye comprised of non-heavy metals distributed throughout the plastic member, the dye being operative for absorbing the light having wavelengths shorter than a lower passband value; and
   c) a dielectric coating in the path and operative for reflecting the light having wavelengths longer than a higher passband value.

2. The optical bandpass filter of claim 1, wherein the dye has a red color and is devoid of cadmium.

3. The optical bandpass filter of claim 1, wherein the dielectric coating is on an outer surface of the plastic member.

4. The optical bandpass filter of claim 1, and a glass plate in the path, and wherein the dielectric coating is on an outer surface of the glass plate.

5. The optical bandpass filter of claim 1, wherein the plastic member surrounds the photodetector.

6. The optical bandpass filter of claim 1, wherein the plastic member is a collection lens.

7. The optical bandpass filter of claim 1, wherein the plastic member has a curved surface for changing a bandpass characteristic of the filter.

8. A method of bandpass filtering light traveling along a path to a photodetector in an electro-optical reader for reading indicia, the method comprising the steps of:
   a) mounting a plastic member in the path;
   b) distributing a dye throughout the plastic member, the dye being comprised of non-heavy metals operative for absorbing the light having wavelengths shorter than a lower passband value; and
   c) positioning a dielectric coating in the path, the dielectric coating being operative for reflecting the light having wavelengths longer than a higher passband value.

9. The method of claim 8, and constituting the dye to have a red color and to be devoid of cadmium.

10. The method of claim 8, wherein the positioning step is performed by applying the dielectric coating on an outer surface of the plastic member.

11. The method of claim 8, wherein the positioning step is performed by positioning a glass plate in the path, and by applying the dielectric coating on an outer surface of the glass plate.

12. The method of claim 8, wherein the mounting step is performed by surrounding the photodetector with the plastic member.

13. The method of claim 8, and constituting the plastic member as a collection lens.

14. The method of claim 8, and forming a surface of the plastic member with a curvature to change a bandpass characteristic of the filter.

15. A method of making an optical bandpass filter for filtering light traveling along a path to a photodetector in an electro-optical reader for reading indicia, the method comprising the steps of:
   a) mounting a plastic member in the path;
   b) distributing a dye throughout the plastic member, the dye being comprised of non-heavy metals operative for absorbing the light having wavelengths shorter than a lower passband value; and
   c) positioning a dielectric coating in the path, the dielectric coating being operative for reflecting the light having wavelengths longer than a higher passband value.

16. The method of claim 15, and constituting the dye to have a red color and to be devoid of cadmium.

17. The method of claim 15, wherein the positioning step is performed by applying the dielectric coating on an outer surface of the plastic member.

18. The method of claim 15, wherein the positioning step is performed by positioning a glass plate in the path, and by applying the dielectric coating on an outer surface of the glass plate.

19. The method of claim 15, wherein the mounting step is performed by surrounding the photodetector with the plastic member.

20. The method of claim 15, and constituting the plastic member as a collection lens.

* * * * *